(12) United States Patent
Iwamura

(10) Patent No.: US 7,039,247 B2
(45) Date of Patent: May 2, 2006

(54) GRAPHIC CODEC FOR NETWORK TRANSMISSION

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 305 days.

(21) Appl. No.: 10/355,496

(22) Filed: Jan. 31, 2003

(65) Prior Publication Data
US 2004/0151390 A1 Aug. 5, 2004

(51) Int. Cl.
*G06K 9/36* (2006.01)
(52) U.S. Cl. .................................................. 382/236
(58) Field of Classification Search ........ 382/232–233, 382/236–240, 244–250; 358/426.13, 426.14; 348/384.1, 390.1, 394.1, 395.1, 400.1, 404.1, 348/407.1–410.1, 420.1–422.1, 430.1–431.1
See application file for complete search history.

(56) References Cited

U.S. PATENT DOCUMENTS

| | | | |
|---|---|---|---|
| 4,785,349 A | 11/1988 | Keith et al. | |
| 5,122,875 A * | 6/1992 | Raychaudhuri et al. | 348/390.1 |
| 5,260,782 A | 11/1993 | Hui | |
| 5,473,377 A | 12/1995 | Kim | |
| 5,486,862 A | 1/1996 | Yagasaki | |
| 5,543,939 A | 8/1996 | Harvey et al. | |
| 5,570,133 A | 10/1996 | Yagasaki | |
| 5,731,850 A | 3/1998 | Maturi et al. | |
| 5,745,379 A | 4/1998 | Lewis | |
| 5,764,921 A | 6/1998 | Banham et al. | |
| 5,790,881 A | 8/1998 | Nguyen | |
| 5,841,473 A * | 11/1998 | Chui et al. | 348/390.1 |
| 5,845,083 A | 12/1998 | Hamadani et al. | |
| 5,864,681 A | 1/1999 | Proctor et al. | |
| 5,870,435 A | 2/1999 | Choi et al. | |
| 5,920,659 A * | 7/1999 | Iverson et al. | 382/298 |
| 5,970,173 A | 10/1999 | Lee et al. | |
| 5,970,233 A | 10/1999 | Liu et al. | |
| 6,078,328 A | 6/2000 | Schumann et al. | |
| 6,163,574 A | 12/2000 | Yagasaki | |
| 6,163,625 A | 12/2000 | Ng et al. | |
| 6,215,905 B1 | 4/2001 | Lee et al. | |
| 6,256,347 B1 | 7/2001 | Yu et al. | |
| 6,272,179 B1 | 8/2001 | Kadono | |
| 6,330,665 B1 | 12/2001 | Wise et al. | |
| 6,415,057 B1 | 7/2002 | Suzuki et al. | |
| 6,529,244 B1 * | 3/2003 | Hrusecky | 348/453 |

* cited by examiner

*Primary Examiner*—Jose L. Couso
(74) *Attorney, Agent, or Firm*—Blakely Sokoloff Taylor & Zafman, LLP

(57) ABSTRACT

Various embodiments of the invention provide a method, system, and apparatus for transmitting screen display information from a remote server to a client. By implementing one or more novel techniques involving content-dependent compression/encoding, block motion estimation, inter-frame and intra-frame block matching, frame memory buffers, and adjustment of screen refresh rates, the transmission rate between a server and a client is significantly decreased.

37 Claims, 11 Drawing Sheets

FIG. 11
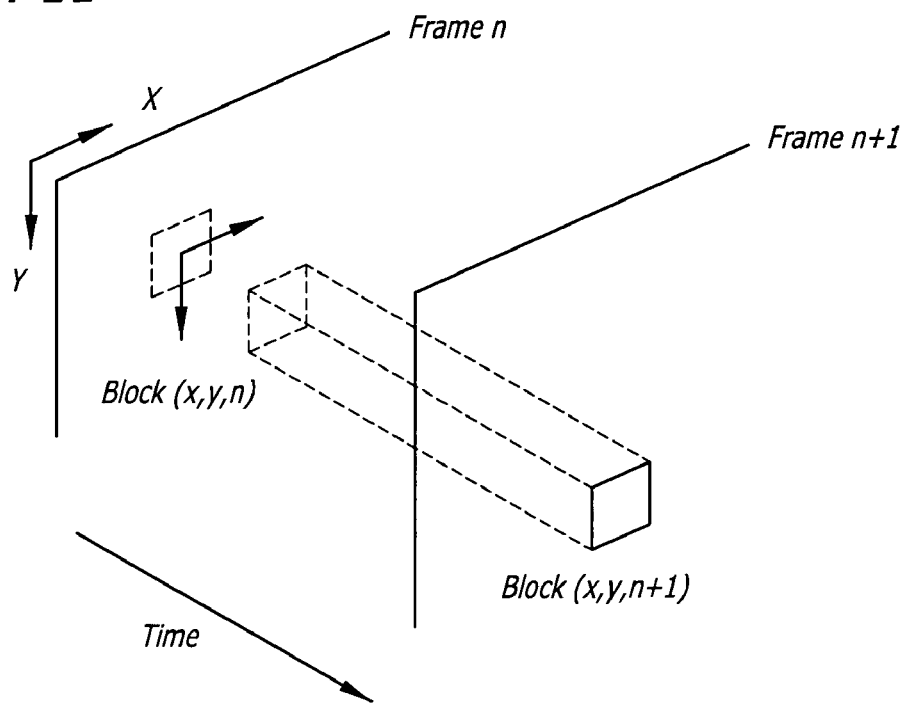
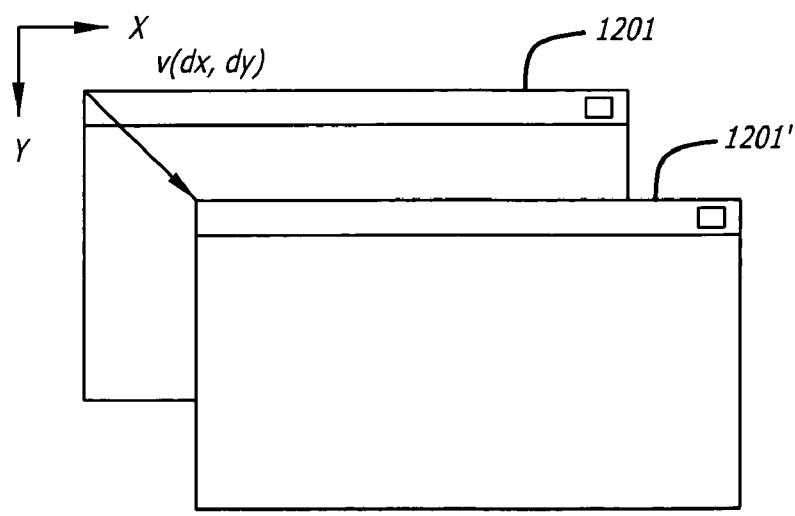
FIG. 12

GRAPHIC CODEC FOR NETWORK TRANSMISSION

FIELD

Various embodiments of the invention pertain, generally, to client-server networks. More particularly, one embodiment of the invention relates a scheme to permit a client to efficiently control a server by reducing the amount of graphics data which is transmitted.

BACKGROUND

In implementing computer networks, it is sometimes desirable to control a server from a client. Several products exist that permit a user to display the desktop of a remote serve on a client display and control the remote server as if it were at hand. A drawback of these products is that the client must be a fully functional computer. This is undesirable from a cost and maintenance point of view.

Implementing such control of a server from a client becomes even more difficult when the client and the server communicate over a wireless link or network. A wireless platform (e.g., a wireless tablet) may be communicatively coupled to a server via a base station which acts as an bridge between a wired communication link to the server and a wireless communication link to the wireless platform. For example, a base station may encode an analog video input signal from the server to a MPEG (encoding scheme defined by the Moving Picture Experts Group) stream and send the MPEG stream to the wireless platform using IEEE 802.11b (2.4 GHz) wireless technology. The wireless platform receives and decodes the MPEG stream and displays the information. However, the amount of display information from the server to the wireless platform is an obstacle in implementing remote control of a server via a wireless client.

Generally, computer video graphics baseband data is large in size and requires a very fast transmission rate. For example, the picture size of a display monitor may be one thousand twenty-four (1024) by seven hundred sixty-eight (768) pixels. Thus a single frame is 18,874,368 Megabits (Mbits) in size or 18.9 Mbits/frame (1024 rows×768 columns×8 bits×3 colors). At a display refresh rate of 30 frames per second, this amounts to five hundred sixty seven (567) Mbits/second (Mbps) (18.9 Mbits/frame×30 frames/second). Such data rate is too fast for most existing common data networks. The transmission rate for typical data networks is typically in range the range of five (5) to twenty (20) Mbits/second.

Video compression permits a reduction in the size of data being transmitted. The Moving Picture Experts Group defined one widely used video compression scheme commonly known as MPEG. However, MPEG employs lossy compression and is optimized for natural motion pictures. Its performance is not good for computer graphics or text data. Computer graphics and text data typically include many sharp edges and flat plains. MPEG discards high frequency coefficients of Discrete Cosine Transform (DCT) to compress the data. As a result, a ghost edge or mosquito noise often appears around the edge of a previously compressed graphic or text.

FIG. 1A is an example of an original high-contrast edge. After the data is encoded and decoded, the edge has artifacts shown in FIG. 1B.

Another problem with MPEG is its compression ratio. It is usually twenty to one (20–1) to forty to one (40–1). This is not sufficient for transmitting computer graphics over a conventional network and permitting a client to control a server and viewing the server's display. That is, the network transmission rate together with video compression are insufficient to permit displaying the desktop of a remote server on the client's display at the original refresh rate. If the refresh rate on the server display is faster than the network throughput rate then the client's display has noticeable delay and would be hinder practical implementation of a remote controlled server.

SUMMARY

Various embodiments of the invention provide a method, system, and apparatus for transmitting graphical display data from a remote server to a client. By implementing one or more novel techniques involving content-dependent compression/encoding, block motion estimation, inter-frame and intra-frame block matching, frame memory buffers, and adjustment of screen refresh rates, the transmission rate between a server and a client is significantly decreased.

According to one aspect of an embodiment of the invention, computer graphics data (screen display data) which changes frequently (e.g., video streams) may be encoded using lossy coding while graphics data which changes less frequently may be encoded using loss-less encoding.

According to one embodiment of the invention, when a server refreshes a client's screen or display, intra-frame prediction is used to determine if a particular block may be matched to a neighboring block. If no matching block is found in the neighboring blocks, block matching in a certain area is performed to determine a motion vector.

In another embodiment of the invention, if no exact or identical matching block is found in a block matching area, then a block which closely matches the block sought to be encoded may be selected. The encoder (server) sends the decoder (client) the motion vector to the similar block and all dissimilar information between said blocks.

According to one embodiment of the invention, each block includes data with an identifier to specify the type of motion estimation scheme being applied.

According to one embodiment of the invention motion information from the client, such as mouse movement, is employed to reduce the calculations. When the user is using the mouse or the mouse wheel, a motion vector can be easily obtained from its motion and this motion information may be sent to the server for motion estimation purposes.

In one embodiment of the invention, inter-frame block matching is employed. That is, the block sought to be encoded is compared with the blocks in previous frames at the exact same location to determine a match. If a match is found, the encoder informs the decoder that the block may be found in a particular previous frame. One or more previous frames are maintained by the encoder (server) and decoder (client) for this purpose. In one embodiment of the invention, one or more frame memories are maintained for frame memory control (encoding/decoding) of loss-less display areas (e.g., DPCM blocks or areas).

According to another embodiment of the invention, intra-frame and inter-frame prediction may be employed in a hybrid prediction scheme.

According to one implementation of the invention, if the server has multi-user capability, the server can have two or more clients. Each client receives its own graphics data and may be capable of independently controlling the server. In one implementation, each communication to the different clients may be independently encrypted such that a client cannot decode communication between the server and another client.

In another embodiment of the invention, the amount of information transmitted between server and client may be reduced by adjusting the screen refresh rate based on the amount of bandwidth available and/or the activity detected (e.g., client mouse movement).

BRIEF DESCRIPTION OF THE DRAWINGS

FIG. 11 illustrates an exemplary embodiment as to how a motion vector may be determined by block matching according to one embodiment of the invention.

FIG. 12 illustrates an exemplary embodiment as to how a motion vector may be determined when a window is dragged or moved.

DETAILED DESCRIPTION

In the following detailed description of various embodiments of the invention, numerous specific details are set forth in order to provide a thorough understanding of various aspects of one or more embodiments of the invention. However, one or more embodiments of the invention may be practiced without these specific details. In other instances, well known-methods, procedures, and/or components have not been described in detail so as not to unnecessarily obscure aspects of embodiments of the invention.

In the following description, certain terminology is used to describe certain features of one or more embodiments of the invention. For instance a "data stream" may include one or more data packets. Data streams, packets, or information may be sent between a client and server over packet-switched networks including Asynchronous Transfer Mode (ATM), frame relay, Internet Protocol (IP) networks or the like. These packets may be routed over communication paths, which are formed using information-carrying mediums such as electrical wire, optical fiber, cable, bus, air in combination with wireless signaling technology or any combination thereof.

The term "frame" may include one or more blocks of a display screen. The term "block" includes a plurality of pixels of a display screen which may be arranged in a number of ways (for instance, as an n-by-n square of pixels). The term "client" includes devices (e.g., personal computers, laptop computer, etc.) with display, input capabilities, and/or storage capabilities. The term "thin client" refers to a client which has limited or no full-processing capabilities.

The term "application" includes any software program, one or more processor-executable instructions, embedded program, hardware executable sequence, and/or a combination thereof.

The application may be stored in computer readable medium, which is any medium that can store or transfer information. Examples of "computer readable medium" include, but are not limited or restricted to a programmable electronic circuit, a semiconductor memory device being either volatile memory (e.g., random access memory, etc.) or a non-volatile memory (e.g., read-only memory, flash memory, etc.), a floppy diskette, a compact disk, an optical disk, a hard drive disk, or the like.

Figure 1A:
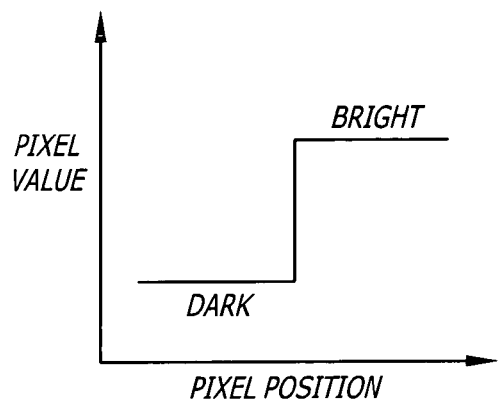
FIGS. 1A and 1B illustrate the difference between a high-contrast edge and same edge after having been decoded.
Figure 1B:
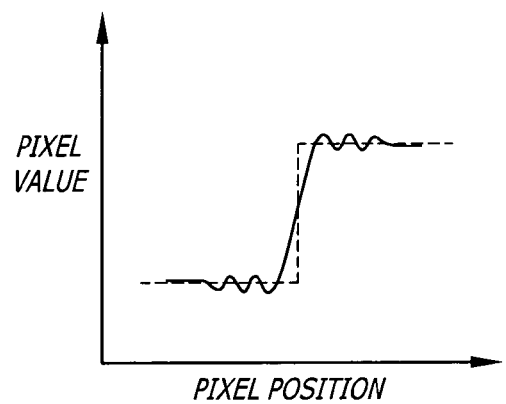
Figure 2:
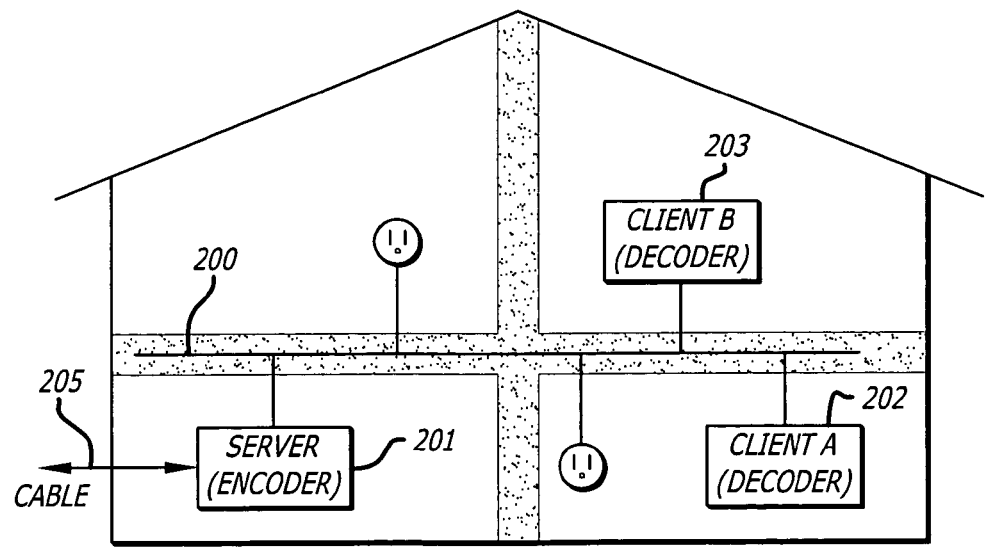
FIG. 2 is a block diagram illustrating a client-server network system according to one embodiment and implementation of the invention.

FIG. 2 is a block diagram illustrating a client-server network system according to one embodiment and implementation of the invention. Server 201 is communicatively coupled to a Client A 202 and a Client B 203 using some communication medium 200. Client A 202 and/or Client B 203 may be positioned in a single location or may be a wireless and/or mobile client.

In one embodiment of the invention, as shown in FIG. 2 for example, the communication medium 200 may be one or more power lines of a building or deployment site through which Server 201 and Client A 202 and/or Client B 203 communicate. In other embodiments to the invention, the communication medium 200 may be other types of information-carrying medium such as an Ethernet network, iLINK, HPNA (Phone line network), airwave transmissions (e.g., wireless communications in accordance with IEEE 802.11a/b, HiperLan/x, upcoming IEEE 802.11g, etc.), the Internet, and/or other types of information-carrying mediums and systems.

The Server 201 may also be coupled to other networks. For example, Server 201 receives cable broadcast programs from Cable 205. Also, Server 201 may have access to the Internet through Cable 205 or other networks.

According to one implementation of an embodiment of the invention, a peer-to-peer transmission system is employed between a server and client. Usually, only one client receives the stream from the server.

A server (e.g., Server 201) includes an encoder implementing one embodiment of the invention, and a client (e.g., Client A 202 and/or Client B 203) includes a decoder implementing one embodiment of the invention.

According to one embodiment of the invention, the client may be a "thin client". The thin client may have a network interface, a controller, a decoder, a monitor display, a mouse and a keyboard. The user can easily control the remote server from this thin client.

One aspect of the invention provides a compression scheme for computer graphics codec (encoding/decoding) that enables transmitting graphic data between a server and a client at effective transmission rates fast enough to enable remote control of the server by the client. An encoder, implementing one embodiment of the invention, compresses graphic data from the server's desktop display. This compressed graphic data is then sent to the client for display. A decoder, implementing one embodiment of the invention, decompresses the graphic data received and provides it to the client display.

Figure 3:
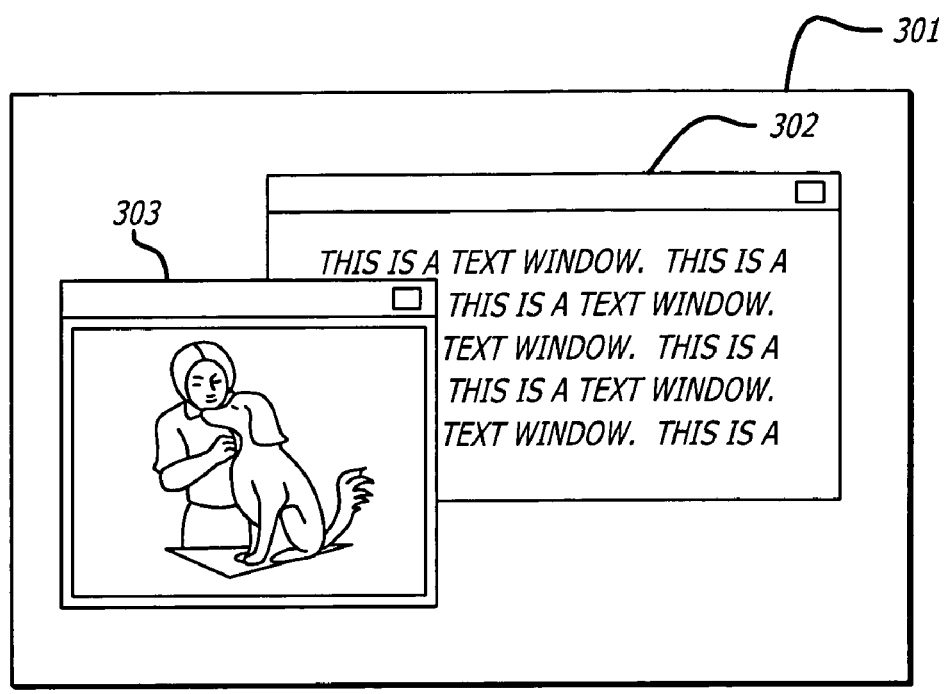
FIG. 3 illustrates an exemplary embodiment as to how a typical computer graphics display data may include both still areas and moving areas.

FIG. 3 illustrates an exemplary embodiment as to how a typical computer graphics display data 301 may include both still areas 302 and moving areas 303. A still area 302 may include, for example, text characters, icons, desktop wallpaper, windows, buttons, menus and other objects. A moving area 303 may include, for example, an animated banner, streaming video, etc.

Figure 4:
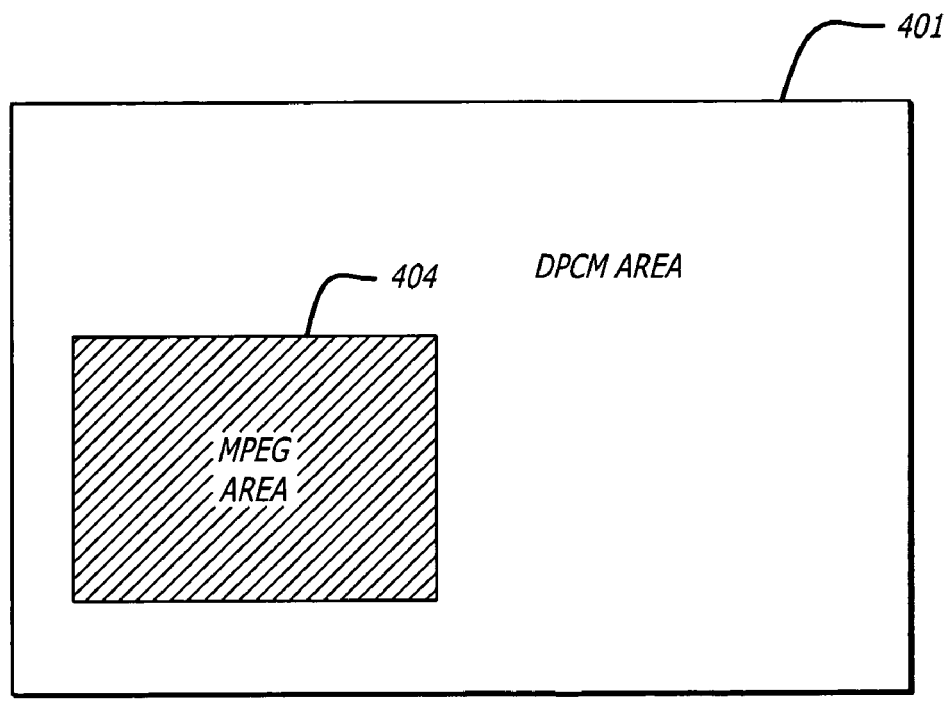
FIG. 4 illustrates an exemplary embodiment of the invention where different types of graphics data are encoded using different schemes.

FIG. 4 illustrates an exemplary embodiment of the invention where different types of graphics data are encoded using different schemes. That is, a graphics data which changes frequently (e.g., video streams) may be encoded using lossy coding while graphics data which changes less frequently may be encoded using loss-less encoding.

According to one embodiment of the invention, MPEG compression is employed for moving areas 404. MPEG is lossy coding, but fortunately, human eyes do not easily detect artifacts in moving area.

According to one embodiment of the invention, loss-less Differential Pulse Code Modulation (DPCM) encoding is employed for still areas 401. Typically, still areas need higher quality compression than moving areas. One implementation of DPCM is used, for example, in JPEG loss-less mode. The advantage of DPCM is that it is loss-less. That means the decoder reconstruct an identical image to the original image. A disadvantage of DPCM is that it has a low compression ratio. Usually, DPCM compresses natural image data to around one-half the size of the original image data. However, in case of computer graphics, the compression ratio is typically between four-to-one (4:1) to ten-to-one (10:1) because the images usually have more flat portions. DPCM compression ratio is generally lower than MPEG. Note that in another embodiment of the invention DPCM encoded areas need not be still areas. Rather, areas which don't change frequently or as frequently as MPEG encoded areas may be encoded using loss-less encoding (e.g., DPCM).

According to various embodiments of the invention, novel motion estimation, motion compensation and other schemes are introduced to obtain higher, more efficient compression.

In one implementation of the invention, video data is encoded on block basis, for example, eight-by-eight (8×8) pixel blocks as a MPEG encoder uses. A block may be categorized as one of two types, either MPEG block or DPCM block. There are identifier bits as part of the block data, which identify the encoding type for that block. Based, at least partially, on the encoding type bit(s), the decoder determines the encoding type and selects an appropriate decoding scheme. Such identification may be through a "data identifier" or "data selector" being hardware, firmware or an application adapted to perform such functionality.

The encoder monitors motion of each block for a certain time period. If the block is consecutively or frequently active, the encoder groups the block into MPEG blocks so that if may be MPEG-encoded. If not, the block is grouped into DPCM blocks and it is DPCM-encoded.

Figure 5:
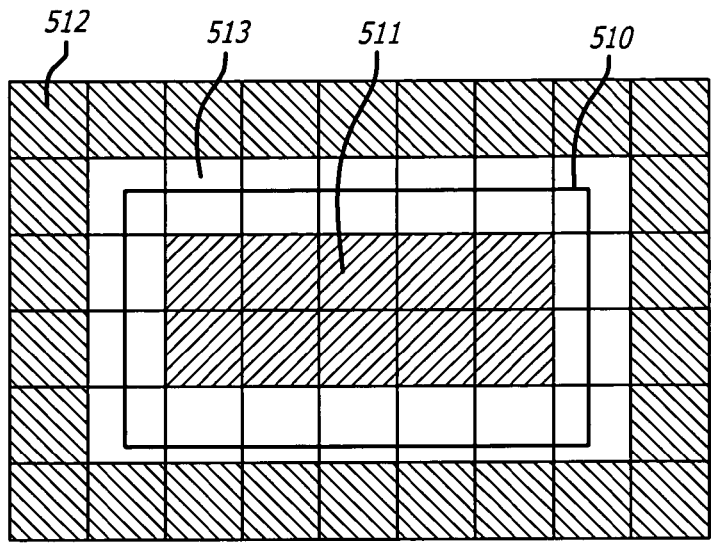
FIG. 5 illustrates an exemplary embodiment of a moving area where the moving area boundary does not fall on a block boundary.

The boundary between the moving area and the still area is not always on a block boundary. For example, FIG. 5 illustrates an exemplary embodiment of a moving area where the moving area boundary 510 does not fall on a block boundary. The moving area boundary or active area boundary 510 encloses the region determined to be active, moving, and or changing for a period time. The area outside this boundary 510 is the still area. The active area includes hatched blocks 511 which are marked for MPEG-encoding. The still area includes dotted blocks 512 which are marked for DPCM-encoding. The white blocks 513 are boundary blocks.

In one embodiment of the invention, the boundary blocks 513, are DPCM-encoded. When the encoding rate is low, a step artifact may appear between the MPEG blocks and the DPCM blocks. A filter may be applied to smooth this difference.

According to one embodiment of the invention, when a client decodes a video stream sent from the server, all the blocks may be MPEG blocks (e.g., MPEG-encoded blocks). In this case, the client works as a monitor or TV. The active area employs conventional MPEG motion estimation and compensation. Each frame is encoded as I-frame, P-frame or B-frame. An I-frame is intra-encoded. No motion vector is used in an I-frame. P-frame and B-frame are reconstructed from I-frame and/or another P-frame using motion vectors.

The inactive area employs different motion estimation and/or compensation, which is completely independent of the MPEG area. Motions in computer graphics are unique and very different from natural video pictures. Linear motions are very frequent. For example, linear operations may include horizontal and/or vertical scroll, window open or close, window resize or drag, button or icon click(s), highlighting, cursor move, cursor or icon blink, pop-up or pull-down menus, etc. Also, an object (e.g., an icon, a window, etc.) is often covered with another object and uncovered again.

In order to efficiently encode these motions and/or object movements, one aspect of the invention introduces various novel encoding schemes.

Figure 6:
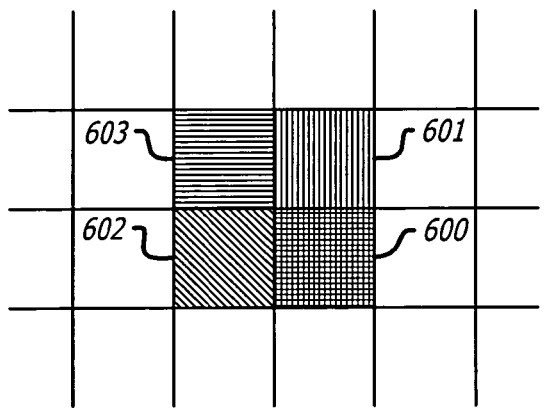
FIG. 6 illustrates a predictive scheme using the three neighbor blocks of the block to be decoded according to one aspect of one embodiment of the invention.

According to one embodiment of the invention, intra-frame prediction is used when a server sends the first frame or the server refreshes the same screen. Previous frames are not used for intra-frame prediction. Neighbor blocks are often identical or similar in computer graphics. For example, FIG. 6 shows the Block 600 to be encoded and the three neighbor Blocks 601, 602, and 603. The blocks on the screen are encoded or decoded from left to right and from upper (top) to lower (bottom) on the screen. Therefore, the right block and lower blocks are not available when Block 600 is encoded or decoded.

If Block 600 is identical to one of the three neighbor blocks, the identifier that indicates the identical neighbor block is employed instead of the full DPCM data of Block 600. That is, in one embodiment of the invention, along with the bits at the top of each block, one or more bits or markers are used to indicate whether the block is identical to one of the three neighbor blocks and identifies said neighbor block. This permits transferring just the minimal information about the block and not information about every pixel therein. This prediction scheme significantly reduces transmission data.

If no identical block is found in the neighboring blocks, block matching in a certain area is performed to determine a motion vector.

Figure 7:
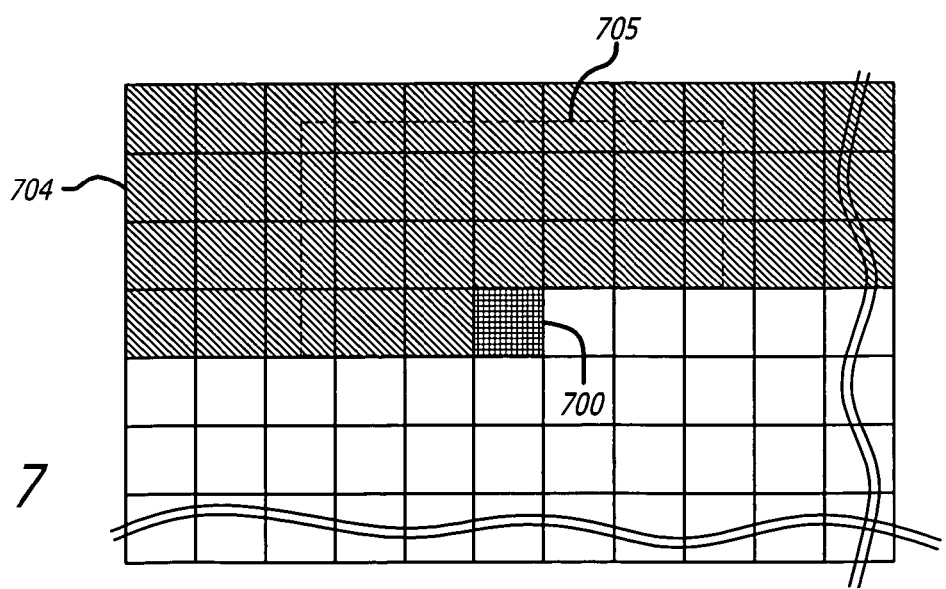
FIG. 7 illustrates an exemplary embodiment as to how a block may be encoded using another block in the same frame according to one aspect of one embodiment of the invention.

FIG. 7 illustrates an exemplary embodiment as to how a Block 700 may be encoded using another block in the same frame according to one aspect of one embodiment of the invention. At the encoder, the blocks in Area 704 (the hatched area) are already encoded and, thus, are available for block matching. That is, since the blocks in Area 704 were recently encoded, they remain available for block matching purposes. The block matching area may be, for example, Area 705. The block matching Area 705 may be scanned or searched for a block matching Block 700 (e.g., identical pixel-by-pixel match). If a matching block is found in Area 705, then a motion vector may be generated. The motion vector is the displacement between Block 700 and the matching block selected. Instead of sending the actual Block 700, the motion vector is sent to the decoder thereby reducing the size of the information transmitted. Using the motion vector and recently decoded blocks, the decoder may recreate Block 700.

In another embodiment of the invention, if no exact or identical matching block is found in the block matching Area 705 (FIG. 7), then a block which gives the minimum dissimilarity (difference) from Block 700 may be selected. The motion vector from the closely matching block, the dissimilarity data between the original block (e.g., Block 700) and predicted block (closely matching block) are encoded and sent to the decoder. The decoder can then employ this motion vector and dissimilarity data to reconstruct Block 700.

As described above, linear motions like scrolling or dragging are quite frequent in computer graphics implementations. It is also typical that when a window is partially or completely covered by another window, the covered window or portion of a window will often appear again later. By using previous frame data, the server can drastically reduce transmission data to a client.

In one embodiment of the invention, inter-frame block matching is employed. That is, the block sought to be encoded is compared with the blocks in previous frames at the exact same location. Thus, if a change in a block is detected, block matching is performed using blocks in the same location in previous frames (e.g., previous frames stored in memory). If a match is found then a reference to the block in the previous frame is sent to the decoder. The decoder utilizes this received information and previously stored frame to reconstruct the block of interest.

Figure 8:
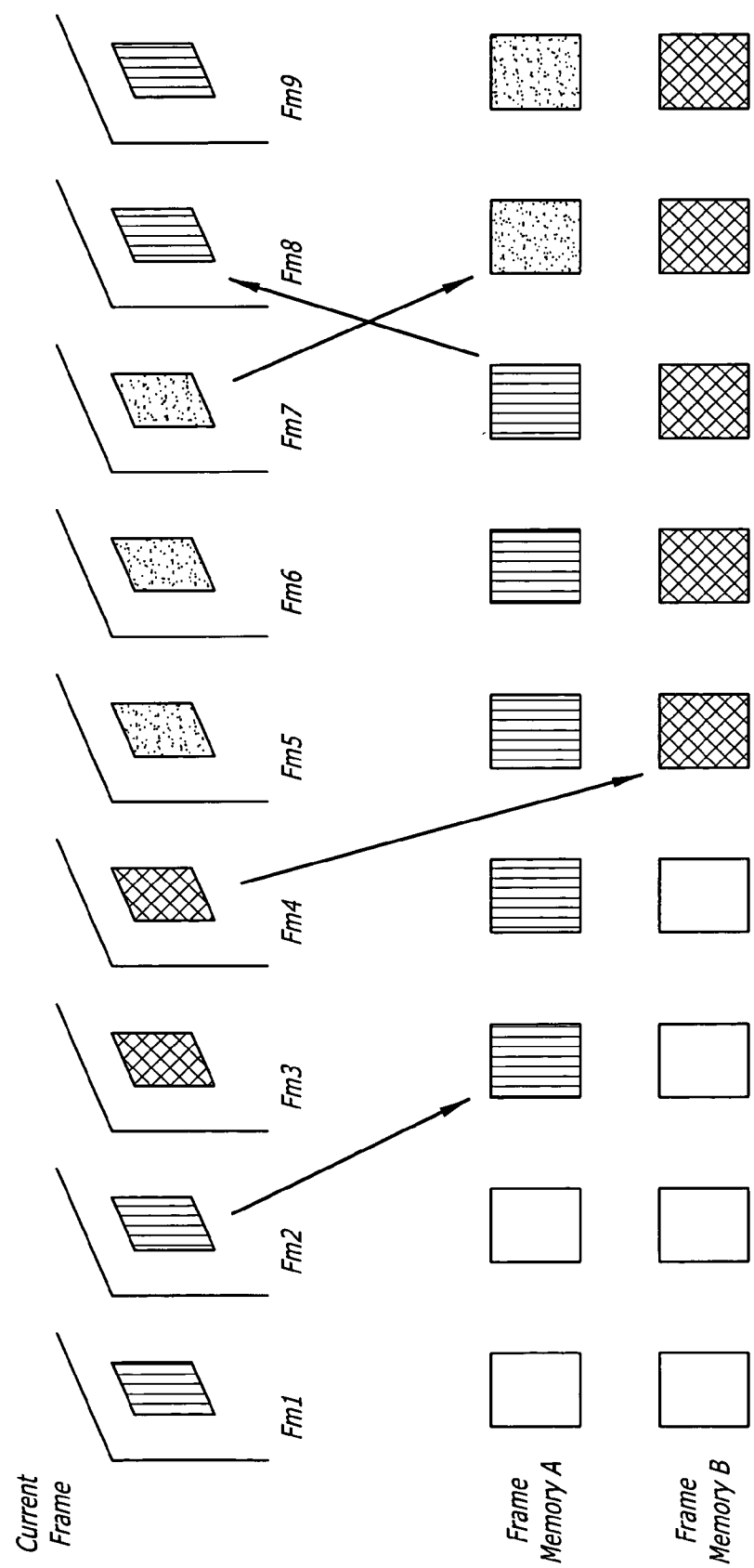
FIG. 8 illustrates an exemplary embodiment as to how frame memory may be implemented for block matching according to one embodiment of the invention.

FIG. 8 illustrates an exemplary embodiment as to how frame memory may be implemented for block matching according to one embodiment of the invention. In one embodiment of the invention, such frame memory implementation may be employed for frame memory control of DPCM areas. The encoder has two frame memories to store two previous frames. As the Current Frame (Fm1 to Fm 9) changes over time (e.g., Fm3, Fm5, and Fm8), Frame Memories A and B store the previous frames. At Fm 3, the block of the previous frame (Fm 2) is stored to Frame Memory A. Similarly, at Fm5, the block of Fm4 is stored to Frame Memory B. Every time the block changes, the previous block is alternately stored to Frame Memory A or B. The block in Fm2 and Fm8 are identical. This may occur when the front window is closed and the first window behind appears again. The new block of Fm8 does not need full encoding. The block data in Frame Memory A is used instead. That is, the encoder or server merely indicates to the decoder or client to use this previous block which the decoder or client has also previously stored, for instance, in a one or more frame memories. This prediction scheme efficiently reduces the transmission data.

According to one embodiment of the invention, the frame memories are controlled on a block basis. That is, each block in the frame memories does not always hold data for the same frame. For example, a block with no motion for twenty (20) frames holds the data twenty (20) frames before while another block in the same frame memory may hold data for the previous frame. Note that this is a different technique from MPEG motion estimation and prediction which are typically done on a frame basis. Bi-directional prediction, which is common in MPEG is not used here. No B-frame exists. No future frame is stored in the frame memory. One reason is backward prediction (i.e. prediction from the future frame) is not so efficient in computer graphics as in a natural video sequence. Another reason is the future frame should be transmitted to the client before the B-frame. Reordering frames by the client causes at least a frame delay, which is not good for display speed in the client.

Figure 9:
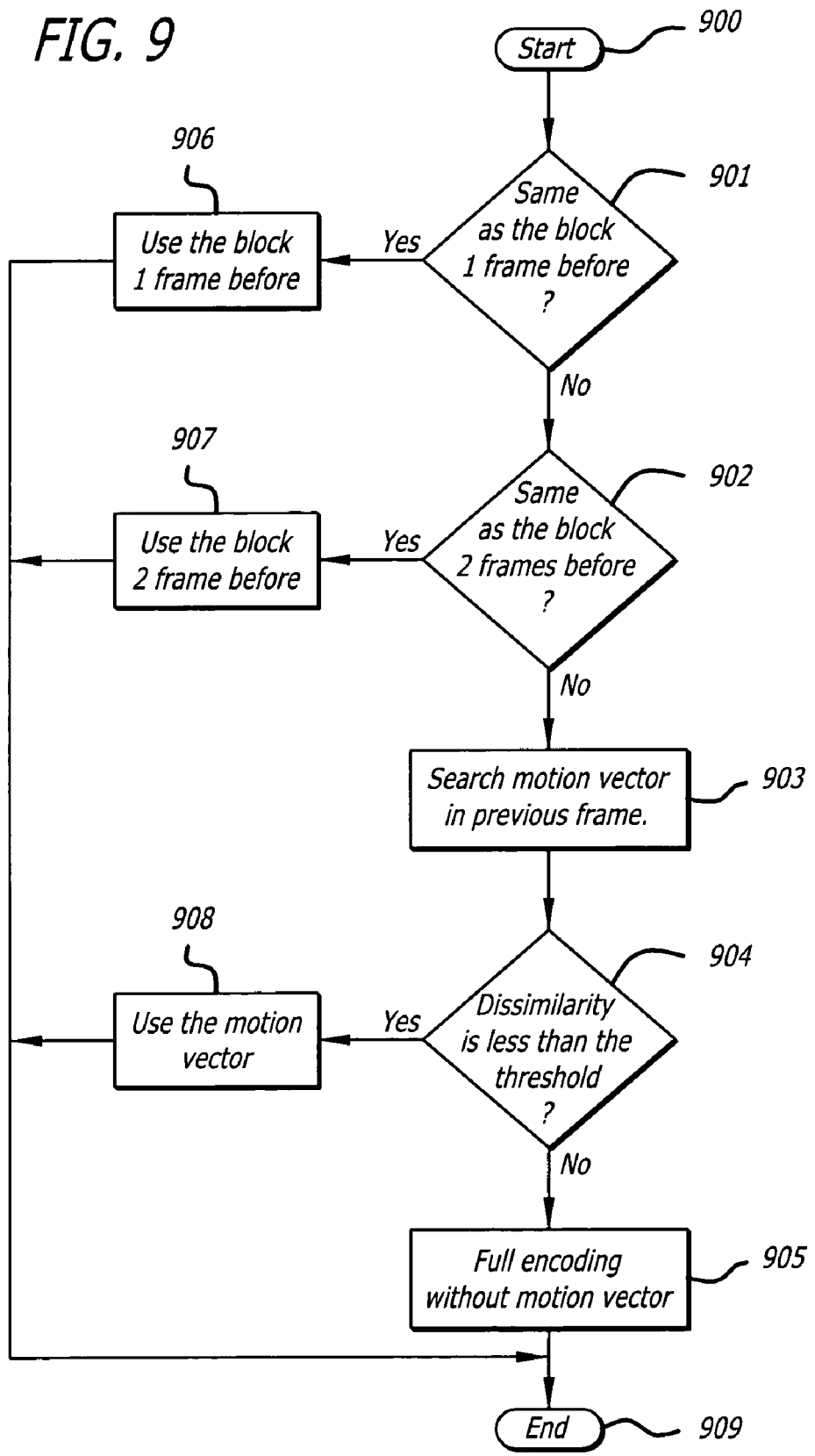
FIG. 9 is a block diagram illustrating motion estimation using inter-frame prediction according to one embodiment of the invention.

FIG. 9 is a block diagram illustrating motion estimation using inter-frame prediction according to one embodiment of the invention. If it is determined that a block has changed, the inter-frame motion estimation procedure starts (item 900). That is, motion estimation attempts to determine whether the same block can be found in previous frames in the same location within the frame. If the block sought to be encoded completely matches with the block from the previous frame (item 901), the block from the previous frame is used (item 906). That is, the encoder or server may indicate to the decoder or client to simply reuse the block from the previous frame, which may be stored in memory. If not, the block sought to be encoded is compared with the block two frames before (item 902). If matched, the block from two frames before is used (item 907).

If no match is found, block matching starts and the motion vector in the previous frame is obtained (item 903). That is, block matching is performed by searching for a matching block, within a defined search area, in a previous frame. If the dissimilarity with another block in the previous frame is less than a certain threshold, a motion vector is employed with that block (items 904 and 908). If not, then the block is fully encoded without motion estimation (item 905). Block motion estimation then ends (item 909).

According to one embodiment of the invention, each block includes data with an identifier to specify which motion estimation scheme applies, if any. That is, one or more bits of each block may be employed to identify whether the previous frame, two frames before, or a motion vector from the previous frame is being employed. Based on the identifier, the decoder is able to reconstruct the block.

According to another embodiment of the invention, intra-frame and inter-frame prediction are employed in a hybrid prediction scheme. The goal is to encode a given block to the minimum data size. If an identical block is found in the current or the previous frames, that block is used. If not, the motion vector that minimizes the dissimilarity is chosen.

Figure 10:
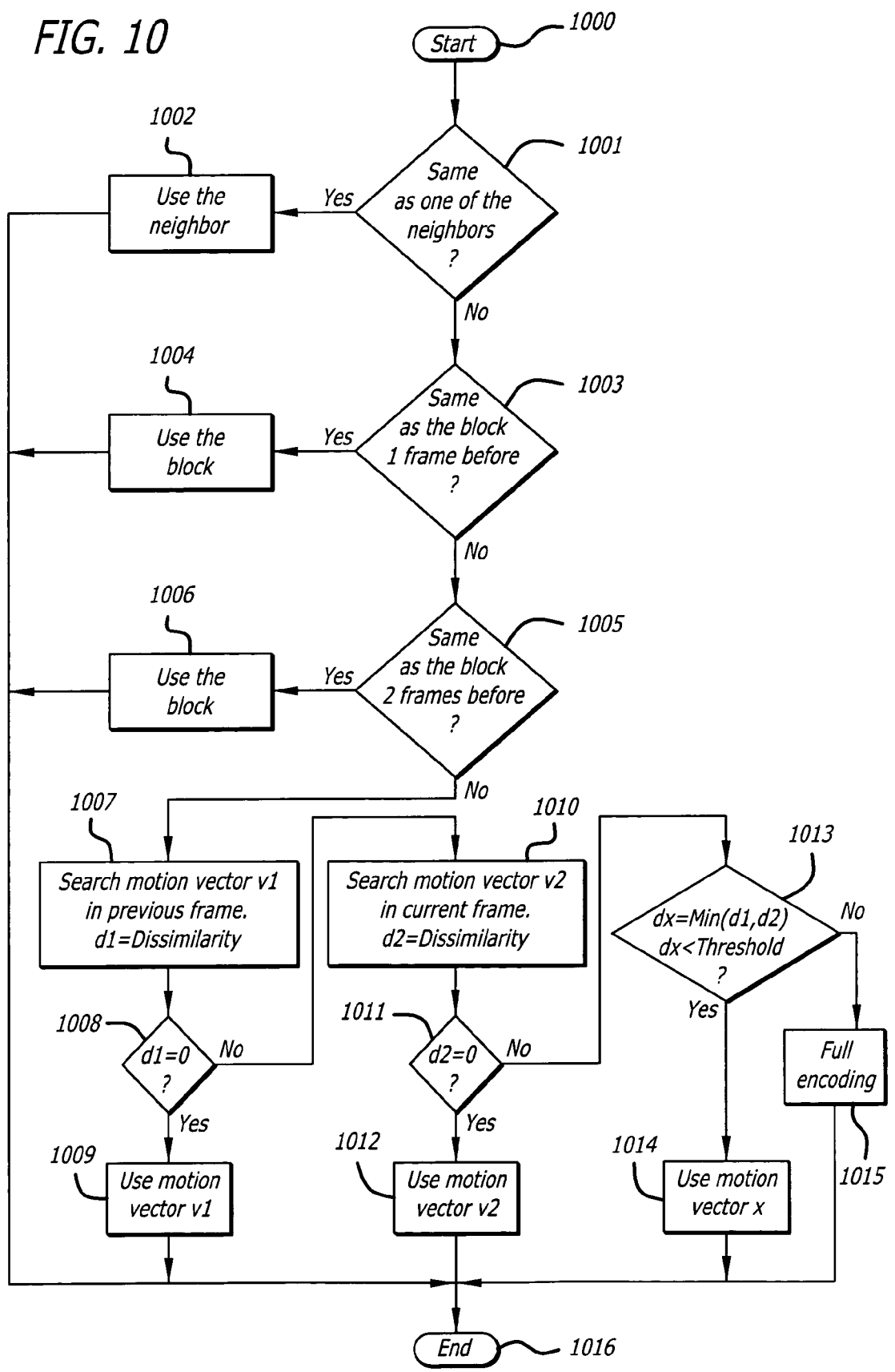
FIG. 10 is a block diagram illustrating a hybrid motion estimation scheme according to one embodiment of the invention.

FIG. 10 is a block diagram illustrating a hybrid motion estimation scheme according to one embodiment of the invention. If it is determined that a block has changed, the motion estimation procedure starts (item 1000). If the block sought to be encoded matches one of its three neighbors (item 1001), that neighbor block is used (item 1002). If not and the block matches the block in the same location in the previous frame (item 1003), that previous block is used (item 1004). If not and the block matches the block at the same location two frames before (item 1005), that block is chosen (item 1006).

If the block sought to be encoded does not match any of the above blocks, then block matching starts. Block matching in the previous frame is performed. Motion vector v1 and the dissimilarity d1 are calculated (item 1007) from block matching in the previous frame. If d1 is zero, i.e. an identical area has been found in the previous frame (item 1008), the motion vector v1 is used (item 1009). If not, block matching in the current frame starts. Motion vector v2 and the dissimilarity d2 are calculated (item 1010) from block matching in the current frame. If d2 is zero, i.e. an identical are has been found in the current frame (item 1011), motion vector v2 is used (item 1012). If not, the smaller value of d1 and d2 is compared with a certain threshold (item 1013). If the smaller value is less than the threshold, the motion vector with the smaller value is used (item 1014). If not, full encoding is performed (item 1015) and the motion estimation process ends (item 1016).

FIG. 11 illustrates an exemplary embodiment as to how a motion vector may be determined by block matching according to one embodiment of the invention. The current frame is Frame n+1. The reference frame is Frame n. The block notation "Block (x, y, n)" indicates the block is in frame n and the upper left corner of the block is (x, y). To find a motion vector for Block (x, y, n+1) in Frame n+1, the previous Block (x, y, n) in Frame n is tested first. If each pixel in Block (x, y, n+1) is equal to the associated pixel in Block (x, y, n), the motion vector is (0,0). If not, by moving Block (x, y, n) within a certain search area, the best position is determined so that the dissimilarity of both blocks is minimal. The search area should be, for example, a sixty-four by sixty-four (64×64) pixel area. As the search area is expanded, calculation times for a motion vector search increases exponentially.

The invented system employs mouse motion information to reduce the calculations. When the user is using the mouse or the mouse wheel, a motion vector can be easily obtained from its motion. FIG. 12 illustrates an exemplary embodiment as to how a motion vector may be determined when a window is dragged or moved.

The window 1201 is moved in a lower right direction. The motion vector of the mouse cursor is (dx, dy) and the window 1201 to 1201' should have the same motion vector. The server receives mouse motion data (dx, dy) from the client over the network. The vector v(dx, dy) is sent to the encoder and used for motion vector search. For example, in the case illustrated in FIG. 11, Block (x-dx, y-dy, n) in Frame n is searched first and if a good matching result is not obtained, the neighbor area is searched next. A full area search is not required. The same scheme may also be applied to horizontal and/or vertical scrolling. The distance of motion may be obtained when the user slides the scroll button or rotates the mouse wheel. Based on this distance, a motion vector search may be implemented.

In one implementation, the direction of the scroll bar is opposite to the scroll direction. When the scroll bar is pulled down, the text in the window scrolls up. The motion vector may be inverted in case of scrolling. By using mouse motion information, a substantial amount of motion vector calculation time can be saved.

Figure 13:
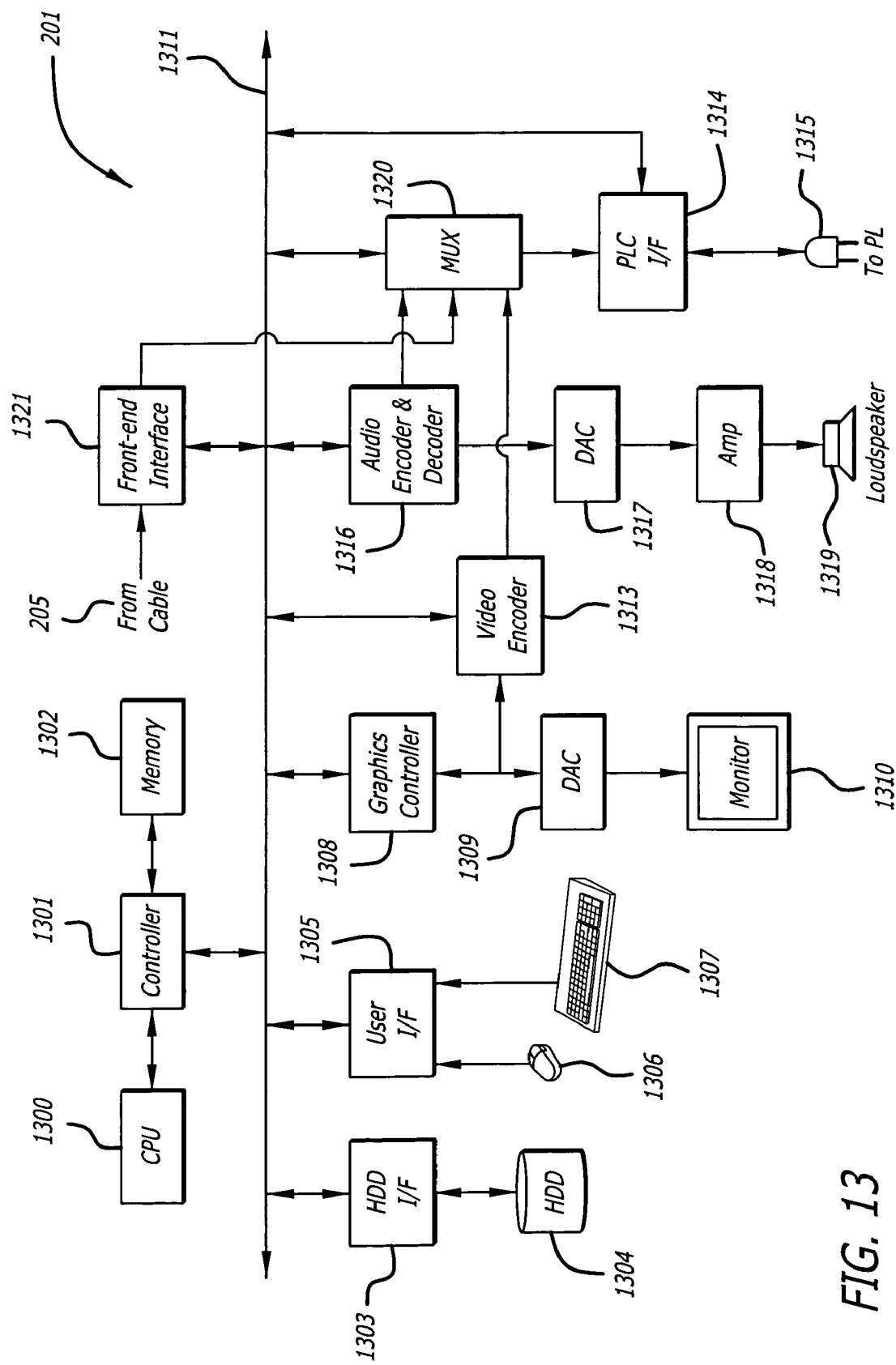
FIG. 13 is a block diagram illustrating a server according to one embodiment of the invention.

FIG. 13 is a block diagram illustrating Server 201 according to one embodiment of the invention. Server 201 may have a system architecture similar to that of a computer system. A central processing unit (CPU) 1300 accesses Memory 1302 through Controller 1301. Also, CPU 1300 may control the other blocks on Bus 311 through Controller 1301. A hard-disk drive (HDD) 1304 or other storage device is connected to Bus 1311 through the HDD interface (I/F) 1303. The operating system (OS) and application software may be stored in HDD 1304.

One or more input devices, such as a Mouse 1306 and/or Keyboard 1307, may be connected to Bus 1311 through User Interface 1305. Graphics data stored in Memory 1302 and/or HDD 1304 is sent to Graphics Controller 1308.

The output baseband signal from Graphics Controller 1308 is analog-digital converted in DAC 1309. The analog output of DAC 1309 is sent to Monitor 1310. Audio data stored in Memory 1302 and/or in HDD 1304 is decoded in Audio Encoder/Decoder 1316 and digital-analog converted by DAC 1317. The result is amplified by Amplifier 1318 and sent to Loudspeaker 1319.

The output baseband signal of Graphics Controller 1308 is also sent to Video Encoder 1313. Video Encoder 1313 encodes the signal and the result is sent to Multiplexer 1320. An encoded audio signal from 1316 is multiplexed with the encoded video signal by Multiplexer 1320. The multiplexed signal is then sent to a network interface (e.g., PLC Interface 1314).

In an implementation where a network communication system is deployed using the power lines of a building as a communication medium, Server 201, according to one embodiment of the invention, may include a power line Controller Interface (PLC I/F) 1314 to connect Server 201 to the power line network 200 (FIG. 2). The PLC Interface 1314 sends encoded signals to the power line 200 through the power plug 1315. Also, commands may be received by the PLC Interface 1314 from the CPU 1300 are sent over Bus 1311, through PLC Interface 1314 and power plug 1315, to one or more clients (e.g., Client A 202 and/or Client B 203, FIG. 2) through the power line 200. Conversely, PLC Interface 1314 may also receive one or more commands sent by one or more clients (e.g., Client A 202 and/or Client B 203) through the power line 200, to power plug 1315 and PLC Interface 1314, and then to CPU 1300 through Bus 1311. PLC Interface 1314 may also receive data from an input device associated with one or more clients (e.g., from a mouse or keyboard at the client). CPU 1300 controls the server OS or running applications on Server 201 based on this input data from the client. The CPU 1300 may also accept input data from Mouse 1306 or Keyboard 1307, which are coupled to Server 201.

In one embodiment of the invention, Server 201 may be communicatively coupled to other networks and is able to send or relay video, audio, and/or data signals or packets to one or more clients. For example, as shown in FIG. 2, Server 201 may also transmit or broadcast video and/or audio signals received over Cable 205 to Client A 202 and/or Client B 203.

According to one embodiment of the invention, a Front-end Interface 1321 is available to receive transmitted or broadcasted signals over Cable 205. The output stream from the Front-end Interface 1321 may be sent to Multiplexer 1320. Front-end Interface 1321 may also receive various types of data, for example, Internet data such as web data, and sends that data to CPU 1300 through Bus 1311. Based on the data received, CPU 1300 generates graphic data and sends it to Graphics Controller 1308.

Figure 14:
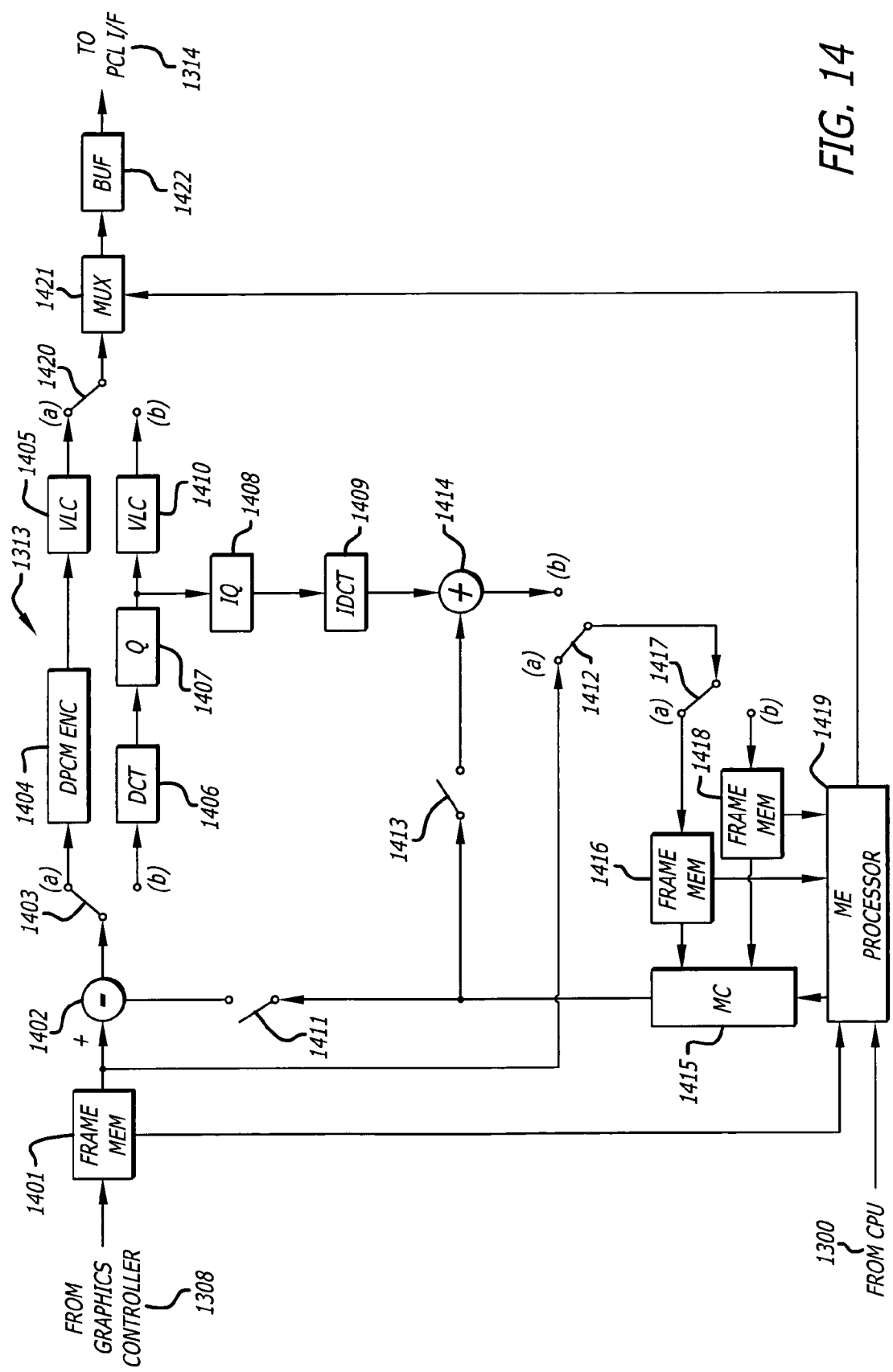
FIG. 14 is a block diagram illustrating a video encoder according to one embodiment of the invention.

FIG. 14 is a block diagram illustrating Video Encoder 1313 of FIG. 13 according to one embodiment of the invention. Video Encoder 1313 may serve to encode graphic data into MPEG blocks. The content of the baseband signal from the Graphics Controller 1308 is stored in Frame Memory 1401 and sent to Subtractor 1402. The result of Subtractor 1402 is sent to a Discrete Cosine Transform block (DCT) 1406 when Switch 1403 is set to position (b). The signal is discrete cosine transformed by DCT 1406 and quantized by Quantizer 1407. The result is sent to Variable Length Coder (VLC) 1410 and Inverse Quantizer (IQ) 1408. By setting Switch 1420 to position (b) the output of VLC 1410 is multiplexed by Multiplexer (MUX) 1421 with motion vector data from Motion Estimation (ME) Processor 1419 and the resulting signal is sent to Buffer 1422. The output of Buffer 1422 is sent to PLC Interface 1314. Meanwhile, the output of Inverse Quantizer (IQ) 1408 is inverse discrete cosine transformed by an Inverse Discrete Cosine Transform block (IDCT) 1409 and sent to Switch 1417 through Adder 1414 and Switch 1412. Switch 1412 is turned to position (b).

Switch 1417 is connected to available frame memory, either Frame Memory 1416 or Frame Memory 1418. ME Processor 1419 may obtain video data from Frame Memory 1401, 1416 and 1418 and calculate motion vectors if necessary. Motion Compensator (MC) 1415 generates motion estimated video data based on motion vectors from ME Processor 1419 and video data from Frame Memory 1416 or 1418. The motion estimated video data from MC 1415 is sent to Subtractor 1402 through Switch 1411. Also, this data is sent to Adder 1414 through Switch 1413.

In case of encoding I-frame or P-frame, Switch 1417 is alternately set between positions (a) and (b). Frame Memory 1416 and 1418 store locally decoded I-frame or P-frame. Switch 1411 and Switch 1413 are closed when a P-frame or a B-frame is encoded. Subtractor 1402 subtracts the output of MC 1415 from the output signal of Frame Memory 1401. Adder 1414 adds the signal from the IDCT 409 with the output from the MC 1415.

To encode an I-frame, Switch 1411 and 1413 are opened. Subtractor 1402 sends the input signal from Frame Memory 1401 to Switch 1403 without subtraction. Adder 1414 sends the input signal from IDTC 1409 to Switch 1417 without addition. MPEG compression ratio is variable and controlled by CPU 1300 based on the network bandwidth. When the network is busy, the data is highly compressed to obtain a low transmission rate.

In case of differential pulse code modulation (DPCM) block encoding, Switches 1403, 1412, 1420 are set to position (a). The output of Subtractor 1402 is encoded by DPCM Encoder 1404 and variable length coded by VLC 1405. The result is multiplexed by Multiplexer 1421 with motion vectors from ME Processor 1419. The multiplexed data is sent to PLC Interface 1314 through Buffer 1422. The output of Frame Memory 1401 also goes to Switch 1417 through Switch 1412. Switch 1417 selects available frame memory, Frame Memory 1416 or 1418. The frame memory stores the block data. If required, ME Processor 1419 obtains the previous or the current frame data from Frame Memory 1416 or 1418 and performs block matching to calculate a motion vector. MC 1415 reconstructs the block based on the motion vector and sends the result to Subtractor 1402 and Adder 1414. When the motion vector is used, Switch 1411 will be closed. Subtractor 1402 calculates the dissimilarity between the original block and the block reconstructed with the motion vector. The result is sent to DPCM Encoder 1404.

According to one embodiment of the invention, CPU 1300 receives input (e.g., mouse device) data from a client (e.g., Client A 202 or Client B 203). The input data (e.g., mouse motion data) is used to reduce motion vector calculation. CPU 1300 sends the mouse data to the Motion Estimation (ME) Processor 1419 in Video Encoder 1313. ME Processor 1419 performs block matching based on this mouse data.

Figure 15:
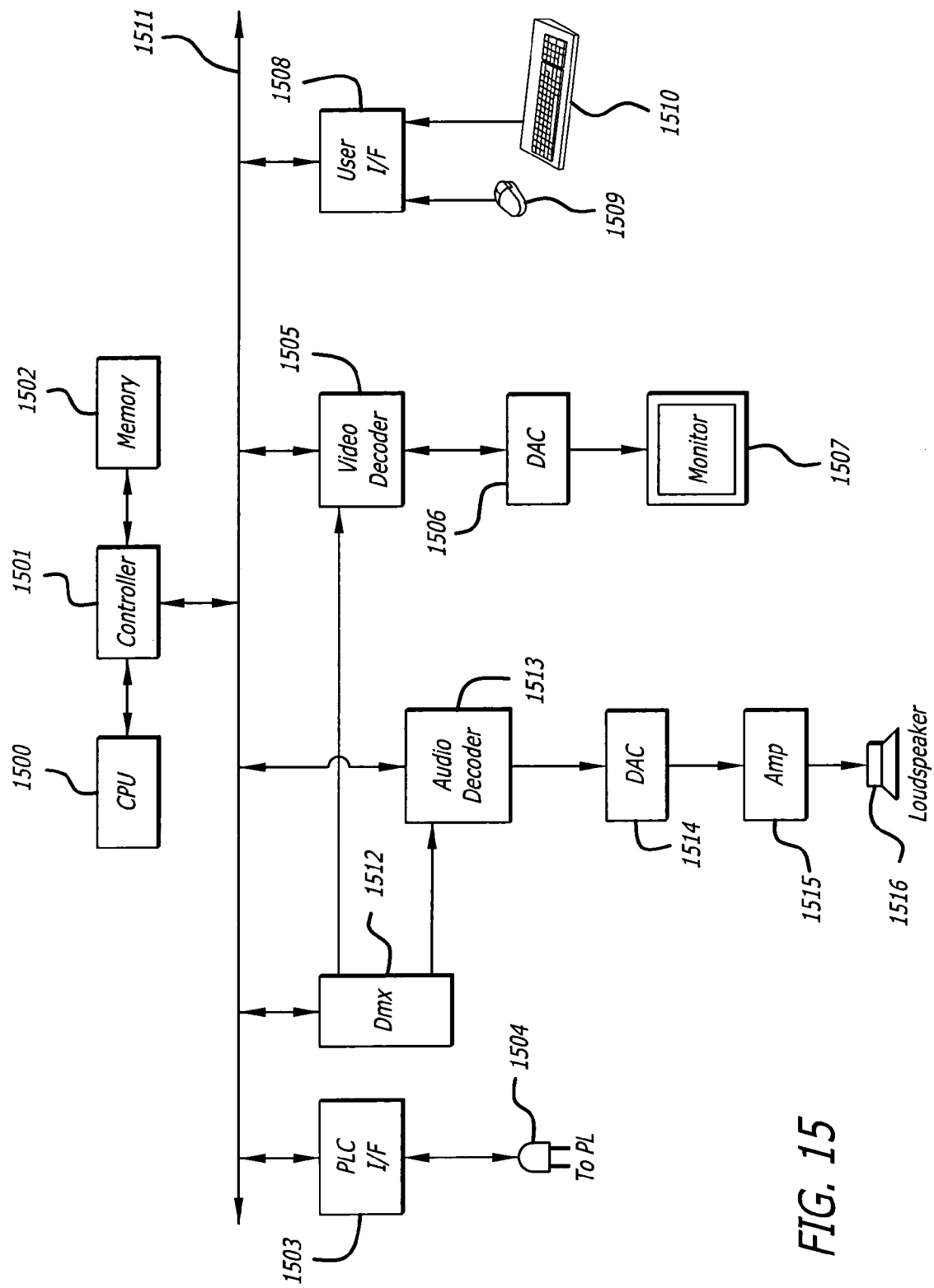
FIG. 15 is a block diagram illustrating a client according to one embodiment of the invention.

FIG. 15 is a block diagram illustrating a client according to one embodiment of the invention. CPU 1500 accesses Memory 1502 through Controller 1501. Also, CPU 1500 controls the other blocks on Bus 1511 through Controller 1501.

According to one embodiment of the invention, CPU 1500 does not have to be a fast, powerful CPU. A small, inexpensive, embedded-type CPU is sufficient for the client. No HDD and No heavy OS is necessary.

Mouse 1509 and/or Keyboard 1510 are connected to Bus 1511 through User Interface 1508. PLC Interface 1503 receives the encoded signal from Server 201 through the power line 200 and the power-plug 1504. Also, PLC Interface 1503 may receive commands from Server 201 through the power line 200 and send those commands to CPU 1500 through Bus 1511. PLC Interface 1503 may receive commands from CPU 1500 through Bus 1511 and send the commands to Server 201 through the power line 200 (FIG. 2). CPU 1500 may also obtain the mouse or keyboard input data and sends it to PLC Interface 1503. The input data is sent to Server 201. The stream signal from PLC Interface 1503 is de-multiplexed to video and audio signal by Demultiplexer 1512. The video signal is sent to Video Decoder 1505 and the audio signal is sent to Audio Decoder 1513.

Video Decoder 1505 decodes the encoded signal from Demultiplexer 1512. Decoded video signal is digital-analog converted by DAC 1506 and sent to Monitor 1507. The audio signal from Demultiplexer 1512 is decoded by Audio Decoder 1513, digital-analog converted by DAC 1514, amplified by Amplifier 1515 and then sent to Loudspeaker 1516.

Figure 16:
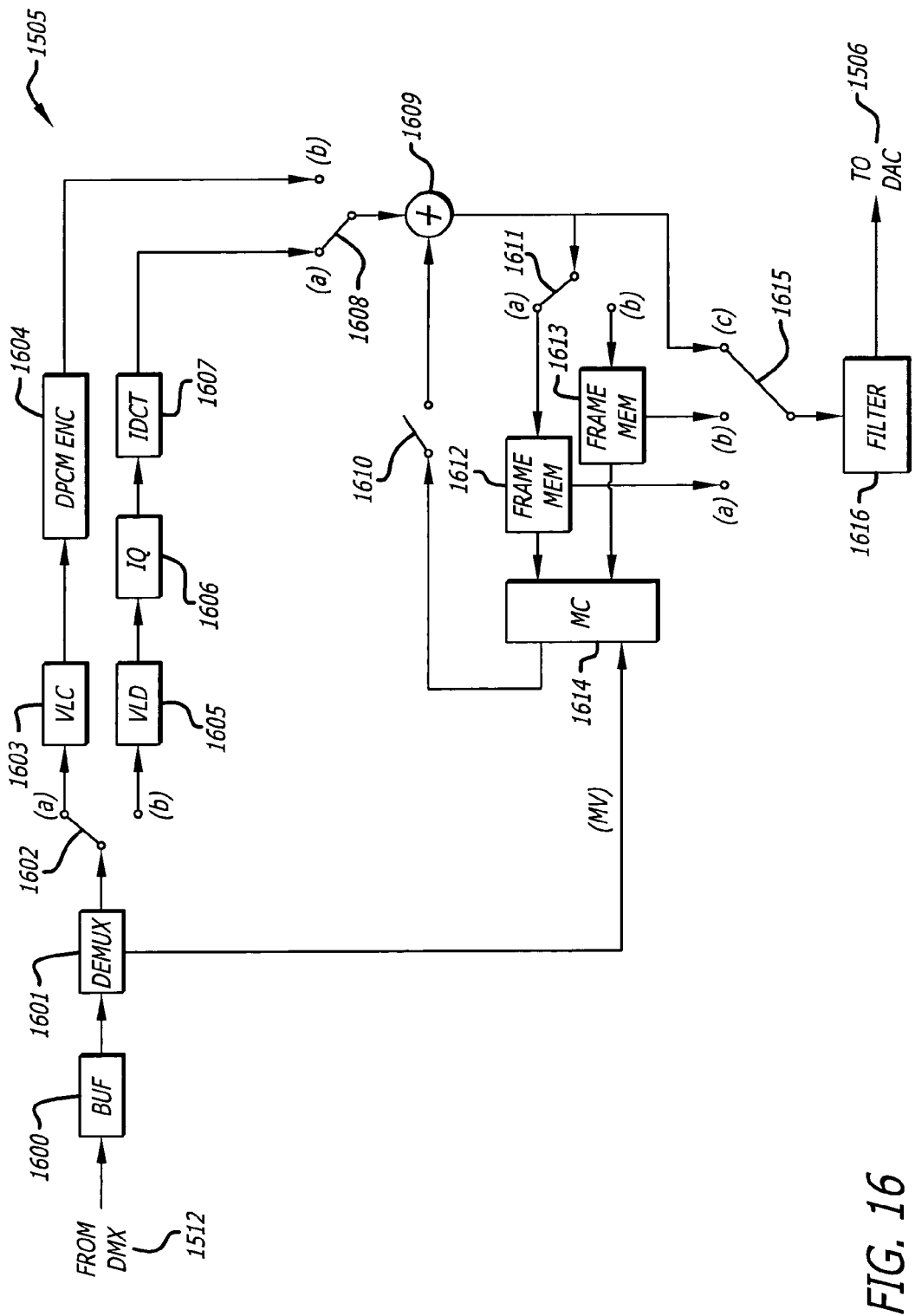
FIG. 16 is a block diagram illustrating a video decoder according to one embodiment of the invention.

FIG. 16 is a block diagram illustrating an exemplary embodiment of Video Decoder 1505 according to one embodiment of the invention. An MPEG encoded block is decoded as follows. The signal from Demultiplexer 1512 is stored in Buffer 1600 and sent to Demultiplexer 1601. Demultiplexer 1601 demultiplexes the input signal and sends encoded video data to Switch 1602. Switch 1602 is set to position b). Demultiplexed motion vector data is sent to Motion Compensator (MC) 1614. The encoded signal is decoded by Variable Length Decoder 1605, inverse quantized by Inverse Quantizer 1606, inverse discrete cosine transformed by IDCT 1607 and sent to Adder 1609 through Switch 1608. Switch 1608 is set to position (a). Adder 1609 adds the signal from Switch 1608 and the signal sent from MC 1614 through Switch 1610. The result is sent to Switch 1611 and Switch 1615 at position (c). The signal from Adder 1609 is stored in either Frame Memory 1612 or 1613. Switch 1611 selects an available frame memory. MC 1614 generates estimated video data from the motion vectors from Demultiplexer 1601 and video data from Frame Memory 1612 or 1613. The generated data is sent to Adder 1609 through Switch 1610. Switch 1611 is set between positions (a) and (b) every time I-frame or P-frame is decoded. Switch 1610 is closed when P-frame or B-frame is decoded. When I-frame is decoded, Switch 1610 is open and no addition is performed by Adder 1609. Switch 1615 is set to position (c) to output I-frame or B-frame and set to position (a) or (b) to output P-frame. Switch 1615 is controlled so that each frame is output in original frame order. The output of Switch 1615 is filtered by Filter 1616 to smooth the boundary between the MPEG area and the DPCM area. The result is sent to DAC 1506.

When the DPCM block is decoded, Switch 1602 is set to position (a) and Switch 1609 is at position (b). The output of Demultiplexer 1601 is decoded by Variable Length Decoder 1603 and DPCM-decoded by DPCM Decoder 1604. The result is sent to Adder 1609. When Switch 1610 is not closed, the signal goes to Switch 1611 and Switch 1615 at position (c) without any addition. Switch 1611 selects an available frame memory 1612 or 1613 and data is stored to the selected frame memory. When the motion vector is encoded, MC 1614 reconstructs the block data using the previous or the current frame stored in Frame Memory 1612 or 1613. The result is sent to Adder 1609. Switch 1610 is closed.

Switch 1615 selects position (a), (b) or (c) for each block. When the block is fully encoded without motion estimation or when the motion vector is used, Switch 1615 is set to position (c). When the block is derived from one of the previous frames, Switch 615 selects position (a) or (b). Note that Switch 1615 switches every frame in MPEG decoding while it does every block in DPCM decoding.

In various implementations of the invention, security of the transmitted data may be a concern (e.g., a power line network may be vulnerable to eavesdropping. Data encryption may be employed for security and privacy in various embodiments of the invention. For example, at the encoder, the Multiplexer 1320 of FIG. 13 may have a Data Encryption Standard (DES) encryptor. At the decoder, the Demultiplexer 1512 of FIG. 15 may have a DES decryptor. To implement the encryption/decryption system, the server and the client may share secret common keys using public-private key exchange scheme, for example, Diffie-Hellman key exchange method. Frequent renewal of the DES key provides robust security.

In one embodiment of the invention, the server and client may have more than two frame memories. This makes DPCM and MPEG encoding more efficient.

While one or more of the exemplary embodiments of the invention described herein employ MPEG and DPMC compression, this is for illustration purposes only, and other compression schemes or combination of compression schemes may be employed without departing from the invention. For example, wavelet transform can be used for still areas (e.g., JPEG-2000 uses wavelet transform).

According to one implementation of the invention, if the server has multi-user capability, the server can have two or more clients. Each client receives its own graphics and independently controls the server. Each communication is independently encrypted. A client cannot decode communication between the server and another client.

Another way of reducing the amount of information transmitted between server and client in a remote server control system is to adjust the screen refresh rate.

In MPEG, an I-frame is encoded, for example, every 15 frames (approximately 0.5 sec). Even if the sequence has no motion, an I-frame is periodically encoded and sent to the display (e.g., sent to the client's display). One reason for I-frame refreshing is to reduce noise accumulation. Another reason is accessibility since in one implementation of the invention the decoder may start decoding with an I-frame. If an I-frame is not frequent, it will take time to start decoding from the middle of the stream. This startup delay may be important for some implementations, such as cable broadcast or storage playback.

Implementing one or more of the techniques described herein (e.g., content-dependent compression/encoding, block motion estimation, inter-frame and intra-frame block matching, frame memory buffers) screen refreshes are required less frequently than a common MPEG codec. The server refreshes the screen, for example, every 10 seconds avoiding busy network traffic. Less frequent screen refreshes contributes much to the reduction of transmitted information.

Another point is that a screen refresh does not have to be finished within one frame period. When the network bandwidth is narrow, the server may slowly and gradually sends one frame data to the client spending more than one frame time. A typical screen refresh may replace each block with an identical block. So, the client user does not notice a screen refresh even when it is slow.

When the network is busy and available bandwidth is narrow, the server is capable of slowly sending one frame of data to the client spending more than one frame time. The client user will see slow screen drawing (e.g., the user might feel the server performance is slow). An advantage of one aspect of the invented system is that no degradation of graphics quality occurs even at low rate transmission. In computer graphics, graphics quality is typically more important than drawing speed.

In one embodiment of the invention, in order to obtain lower transmission rates, the server may stop screen refreshes only when some motion is detected, the server performs a screen refresh. When the screen is completely inactive, no data is sent to the client at all. Also, when the server goes under sleep (e.g., screen-saver) mode, the server can stop all transmissions to clients.

While certain exemplary embodiments of the invention have been described and shown in the accompanying drawings, it is to be understood that such embodiments are merely illustrative of and not restrictive on the broad aspects of various embodiments of the invention, and that these embodiments of the invention not be limited to the specific constructions and arrangements shown and described, since various other modifications are possible. Additionally, it is possible to implement the embodiments of the invention or some of their features in hardware, programmable devices, firmware, software or a combination thereof.

What is claimed is:

1. A method comprising:
    encoding a first type of graphics data using a lossy encoding scheme;
    encoding a second type of graphics data using a loss-less encoding scheme using intra-frame block matching, the intra-frame block matching including
        determining if a first block may be matched to a neighboring block in the same display frame,
        determining if the first block may be matched to other blocks within a certain region of the same display frame if no matching block is found in the neighboring blocks, and
        sending information identifying a matching block to the decoder instead of the actual first block if a matching block is found; and
    transmitting the first and second types of graphics data from an encoder to a decoder.

2. The method of claim 1 wherein the first and second type of graphics data occur in a first display frame.

3. The method of claim 1 wherein the first type of graphics data changes more frequently than the second type of graphics data.

4. The method of claim 1 wherein the first type of graphics data is display graphics data encoded using Moving Picture Experts Group (MPEG) encoding and the second type of graphics data is display graphics data encoded using Differential Pulse Code Modulation (DPCM) encoding.

5. The method of claim 1 wherein, if no matching block is found, then
    a second block which closely matches the first block in the same display frame is selected, the second block closely matches the first block if both the second block and the first block have a minimum threshold of identically matching pixels, and sending to the decoder a vector identifying the second block as well as all dissimilar information between the first block and the second block.

6. The method of claim 1 wherein, if no matching block is found, then the first block is encoded using the loss-less encoding scheme and the encoded information is sent to the decoder.

7. The method of claim 1 further comprising:
receiving motion information from the decoder,
utilizing the motion information to estimate a matching block.

8. The method of claim 1 wherein encoding the second type of graphics data comprises employing inter-frame block matching.

9. The method of claim 8 wherein intra-frame block matching includes,
comparing a first block with a block in an earlier frame, the first block and the block in the earlier frame being located in the same position in their corresponding frames.

10. The method of claim 9 further comprising:
informing the decoder that the first block may be found in the earlier frame, if a match is found.

11. The method of claim 9, further comprising:
maintaining one or more earlier frames in memory, the earlier frames to be employed by the decoder to decode the first block.

12. The method of claim 1 wherein encoding the second type of display graphics data includes employing intra-frame and inter-frame block matching.

13. A system comprising:
an encoder configured to encode a first type of display graphics data using a first encoding scheme and encode a second type of display graphics data using a second encoding scheme, the encoder to encode the second type of display graphics data includes employing intra-frame block matching including,
determining if a first block may be matched to a neighboring block in the same display frame,
determining if the first block may be matched to other blocks within a certain region of the same display frame if no matching block is found in the neighboring blocks, and
sending information identifying a matching block to the decoder instead of the actual first block if a matching block is found; and
a decoder configured to receive the encoded display information and to process the information for display on a display screen.

14. The system of claim 13 wherein the first and second type of display graphics data occur in a first display frame.

15. The system of claim 13 wherein the first type of display graphics data changes more frequently than the second type of display graphics data.

16. The system of claim 13 wherein the first type of graphics data is encoded using lossy encoding and the second type of graphics data is encoded using loss-less encoding.

17. The system of claim 13 wherein, if no matching block is found, then
a second block which closely matches the first block in the same display frame is selected, the second block closely matches the first block if both the second block and the first block have a minimum threshold of identically matching pixels, and sending to the decoder a vector identifying the second block as well as all dissimilar information between the first block and the second block.

18. The system of claim 17 wherein, if no closely matching block is found, then the first block is encoded using a loss-less encoding scheme and the encoded information is sent to the decoder.

19. The system of claim 13 wherein encoding the second type of display graphics data includes employing inter-frame block matching including,
comparing a first block with a block in an earlier frame, the first block and the block in the earlier frame being located in the same position in their corresponding frames, and
informing the decoder that the first block may be found in the earlier frame, if a match is found.

20. The system of claim 19, wherein the decoder further includes
one or more frame memories, one of the one or more frame memories to store an earlier frame which is employed by the decoder to decode the first block.

21. The system of claim 13 wherein encoding of the second type of display graphics data includes employing intra-frame and inter-frame block matching.

22. A video encoder comprising:
a data selector to distinguish between a first data type and a second data type;
a loss-less encoder couple to the data selector, the loss-less encoder to receive and encode data of the first data type from the data selector;
a lossy encoder couple to the data selector, the lossy encoder to receive and encode data of the second data type from the data selector;
an output port to transmit the encoded data of the first and second data types;
a multiplexer coupled to receive data from the lossy encoder and the loss-less encoder and send the received data to the output port; and
an intra-frame motion estimation module coupled to the multiplexer, the intra-frame motion estimation module to perform intra-frame block matching on blocks of the second data type, including (i) determining if a first block may be matched to a neighboring block in the same display frame, (ii) determining if the first block may be matched to other blocks within a certain region of the same display frame if no matching block is found in the neighboring blocks, and (iii) sending information identifying a matching block to the decoder instead of the actual first block if a matching block is found in the same display frame.

23. The video encoder of claim 22 wherein the first and second data types are graphical data types occurring in a first display frame.

24. The video encoder of claim 22 wherein the second data type is graphics data which changes more frequently than the first data type.

25. The video encoder of claim 22 wherein, if no matching block is found, then
a second block which closely matches the first block in the same display frame is selected, the second block closely matches the first block if they have a minimum threshold of identically matching pixels; and
transmitting information identifying the second block as well as all dissimilar information between the first block and the second block.

26. The video encoder of claim 25, wherein if no closely matching block is found, then the first block is encoded using a loss-less encoding scheme and the encoded information is transmitted.

27. A video encoder comprising:
a data selector to distinguish between a first data type and a second data type;
a loss-less encoder couple to the data selector, the loss-less encoder to receive and encode data of the first data type from the data selector;
a lossy encoder couple to the data selector, the lossy encoder to receive and encode data of the second data type from the data selector;
an output port to transmit the encoded data of the first and second data types;
a multiplexer coupled to receive data from the lossy encoder and the loss-less encoder and send the received data to the output port; and
an inter-frame block matching module coupled to the multiplexer, the inter-frame block matching module to perform inter-frame block matching on blocks of the second data type, including, (i) comparing a first block with a block in an earlier frame, the first block and the block in the earlier frame being located in the same position in their corresponding frames, and (ii) transmitting information identifying the earlier frame and that the first block may be found in the earlier frame, if a match is found.

28. The video encoder of claim 27, wherein the decoder further comprising:
one or more frame memories, one of the one or more frame memories to store an earlier frame.

29. The video encoder of claim 22 further comprising:
an intra-frame motion estimation module coupled to the multiplexer, the intra-frame motion estimation module to perform intra-frame block matching on blacks of the second data type occurring in the same display frame.

30. A method comprising:
encoding graphics data using a loss-less encoding scheme using intra-frame block matching, the intra-frame block matching including
determining if a first block may be matched to a neighboring block in a display frame,
determining if the first block may be matched to other blocks within a certain region of the display frame if no matching block is found in the neighboring blocks, and
sending information identifying a watching block to a decoder instead of an actual first block if a matching block is found; and
transmitting the graphics data from an encoder to the decoder.

31. The method of claim 30, wherein the encoding of the graphics data using the loss-less encoding scheme includes encoding a first type of graphics data using the loss-less encoding scheme,
encoding a first type of graphics data using a lossy encoding scheme;
encoding a second type of graphics data using a loss-less encoding scheme.

32. The method of claim 31 further comprises encoding a second type of graphics data using the lossy encoding scheme.

33. The method of claim 32 wherein the first type of graphics data is display graphics data encoded using Moving Picture Experts Group (MPEG) encoding and the second type of graphics data is display graphics data encoded using Differential Pulse Code Modulation (DPCM) encoding.

34. An video encoder comprising:
a loss-less encoder to receive and encode data of a first data type;
a lossy encoder to receive and encode data of a second data type;
an output port;
a multiplexer coupled to receive encoded data from the lossy encoder and the loss-less encoder and send the received encoded data to the output port; and
an inter-frame block matching module coupled to the multiplexer, the inter-frame block matching module to perform inter-frame block matching on blocks of the second data type, including (i) comparing a first block with a block in an earlier frame, and (ii) determining a motion vector based on movement of a user controlled device if the first block does not match the block in the earlier frame.

35. The video encoder of claim 34, wherein the inter-frame matching module to determine the motion vector based on movement of a mouse.

36. The video encoder of claim 34, wherein the inter-frame matching module to determine the motion vector based on movement of a scroll button displayed on a screen.

37. The video encoder of claim 34, wherein the inter-frame matching module to determine the motion vector based on movement of a mouse wheel of a mouse.

* * * * *